(12) United States Patent
Meers et al.

(10) Patent No.: US 8,317,204 B2
(45) Date of Patent: Nov. 27, 2012

(54) LINKABLE DOLLY

(75) Inventors: Ryan C. Meers, Los Angeles, CA (US); Kyle L. Baltz, Redondo Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 767 days.

(21) Appl. No.: 12/238,765

(22) Filed: Sep. 26, 2008

(65) Prior Publication Data

US 2009/0085315 A1 Apr. 2, 2009

Related U.S. Application Data

(60) Provisional application No. 60/975,810, filed on Sep. 27, 2007.

(51) Int. Cl.
*B62B 3/14* (2006.01)
*B62B 1/12* (2006.01)

(52) U.S. Cl. ............................ 280/33.992; 280/79.11

(58) Field of Classification Search ............ 280/33.991, 280/33.992, 33.997, 33.998, 79.11, 638, 280/35, 639, 641
See application file for complete search history.

(56) References Cited

U.S. PATENT DOCUMENTS

| | | | | |
|---|---|---|---|---|
| 2,876,020 A * | 3/1959 | Murchie | ............................ | 5/510 |
| 3,047,305 A * | 7/1962 | Kleinschmidt | ............... | 280/651 |
| 3,092,282 A * | 6/1963 | Tantlinger et al. | ............. | 220/1.5 |
| 3,208,768 A * | 9/1965 | Hulbert | ......................... | 280/408 |
| 3,366,396 A * | 1/1968 | Hardy | ......................... | 280/32.5 |
| 4,171,828 A * | 10/1979 | Goodwin et al. | ............. | 280/638 |
| 5,704,625 A * | 1/1998 | Presnell et al. | ............. | 280/79.2 |
| 2004/0195803 A1 | 10/2004 | Brown | | |
| 2006/0103094 A1* | 5/2006 | Wiff et al. | .................. | 280/79.11 |
| 2008/0111329 A1* | 5/2008 | Brown et al. | ............ | 280/33.997 |

FOREIGN PATENT DOCUMENTS

| | | |
|---|---|---|
| DE | 196 49 982 | 6/1998 |
| EP | 1 125 818 | 8/2001 |
| GB | 2 377 689 | 1/2003 |

OTHER PUBLICATIONS

European Search Report for EP Application No. 08253172.4, Aug. 26, 2009.

* cited by examiner

*Primary Examiner* — J. Allen Shriver, II
*Assistant Examiner* — Bridget Avery
(74) *Attorney, Agent, or Firm* — Carlson, Gaskey & Olds (57) ABSTRACT

A dolly according includes a deck and a plurality of casters extending downward below the deck. A connector is pivotably connected to the deck and is selectively pivotable between a retracted position and a connecting position. The deck also includes a receiver for receiving the connector of a similar dolly adjacent thereto to connect the dolly to the similar dolly.

18 Claims, 15 Drawing Sheets

LINKABLE DOLLY

This application claims priority to U.S. Provisional Application Ser. No. 60/975,810, filed Sep. 27, 2007.

BACKGROUND OF THE INVENTION

Dollies are sometimes used to support goods above the ground and transport goods short distances, such as within a warehouse. A dolly includes a deck for supporting the goods and wheels or casters extending down from the deck. Some dollies are connectable to one another in order to provide a larger support surface.

SUMMARY

A dolly according to one embodiment of the present invention includes a deck and a plurality of casters extending downward below the deck. A connector is pivotably connected to the deck and is selectively pivotable between a retracted position and a connecting position. The deck also includes a receiver for receiving the connector of a similar dolly adjacent thereto to connect the dolly to the similar dolly.

In a method of connecting two dollies according to one embodiment, a connector side of a first dolly and a receiver side of a second dolly are brought toward one another. A connector on the first dolly is rotated about a pivot axis generally parallel to a floor on which the first dolly and second dolly rest, from a retracted position toward a connecting position in which the first dolly and the second dolly are connected.

DETAILED DESCRIPTION OF THE PREFERRED EMBODIMENT

Figure 1:
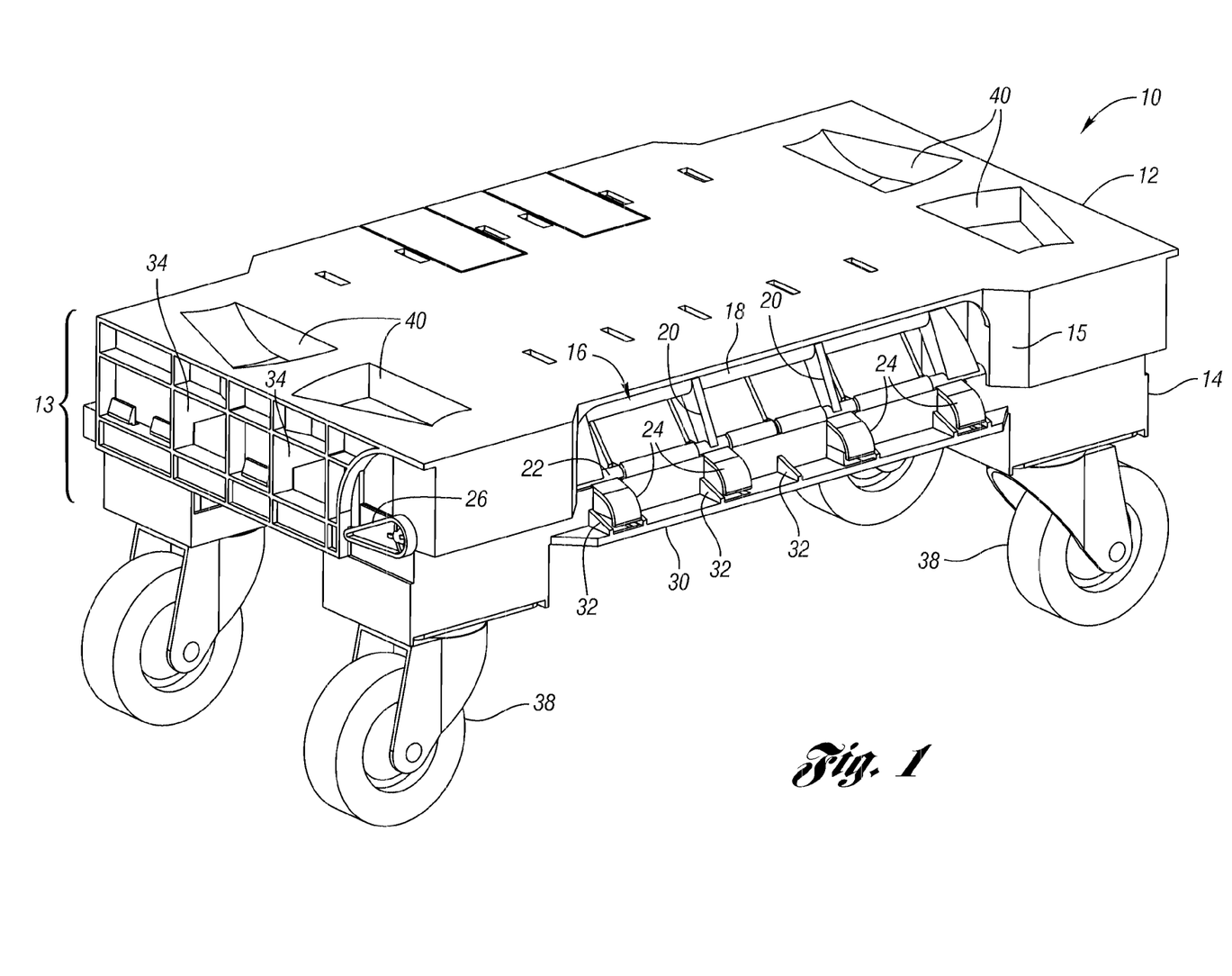
FIG. 1 is a perspective view of a connector side of a dolly according to one embodiment of the present invention.

A dolly 10 according to one embodiment of the present invention is shown in FIG. 1. The dolly includes a deck 13 for supporting goods thereon, the deck 13 including an upper deck portion 12 and a lower deck portion 14. The upper deck portion 12 and lower deck portion 14 define a first side recess 15 in which is pivotably mounted a connector 16. The connector 16 includes a connector bar 18 connected by a plurality of arms to a pivot bar 22. A plurality of downwardly curved levers 24 extend from the pivot bar 22 generally opposite the arms 20. A handle 26 is provided at each end of the dolly 10 (one shown). The handle 26 is connected to (or integrally molded with) the pivot bar 22, such that rotation of the handle 26 causes corresponding rotation of the pivot bar 22, arms 20, connector bar 18 and levers 24. The connector 16 may be metal or a polymer, such as glass-filled nylon.

The lower deck portion 14 includes a ledge 30 protruding laterally from the lower deck portion 14. A plurality of guide ribs 32 extend upward from the ledge 30 adjacent the levers 24.

A pair of pockets 34 are formed in one end of the upper deck portion 12. The pockets 34 are configured to receive a pair of connectors from a handle (not shown), such as is known to be used in moving dollies.

A plurality of wheels or casters 38 extend downwardly from the lower deck portion 14. A plurality of recesses 40 are formed in the upper surface of the upper deck portion 12 for receiving the wheels of a similar deck stacked thereon.

Figure 2:
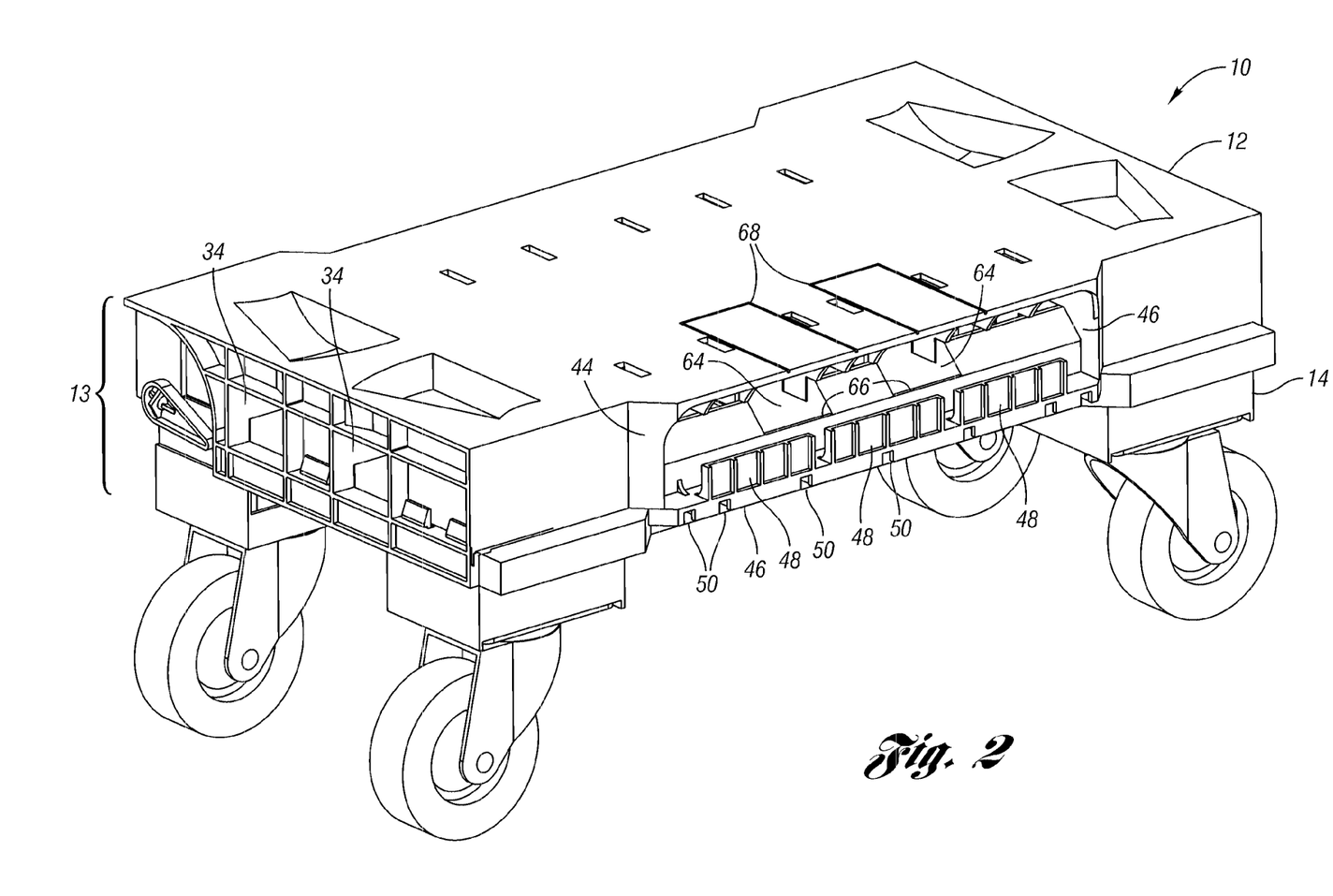
FIG. 2 is perspective view of a receiver side of the dolly of FIG. 1.

FIG. 2 illustrates the receiver side of the dolly 10. The upper deck portion 12 includes a protruding portion 44 defining a large recess 46 in the side of the upper deck portion 12. The lower deck portion 14 includes a ledge 46 further defining the recess 46 in the upper deck portion 12. The lower deck portion 14 further includes a plurality of vertical protrusions 48 protruding upwardly from the ledge 46. The ledge 46 further includes a plurality of channels 50 formed in a lower surface of the ledge 46 and opening outwardly.

A pair of pockets 34 are also formed in this end of the upper deck portion 12. The pockets 34 are configured to receive a pair of connectors from a handle (not shown), such as is known to be used in moving dollies.

Further, a pair of pockets 64 are also formed in the recess 46, in the upper deck portion 12 and the lower deck portion 14. The pockets 64 are configured to receive a pair of connectors from a handle (not shown). The pockets 64 are partially defined by short walls 66 integrally molded with the lower deck portion 14 at the rear of the recess 46. Because the pockets 64 are formed inside the recess 46, indicators 68 are molded into the upper surface of the upper deck portion 12, aligned with the pockets 64. This assists the user in locating the handle in to the pockets 64.

Figure 3:
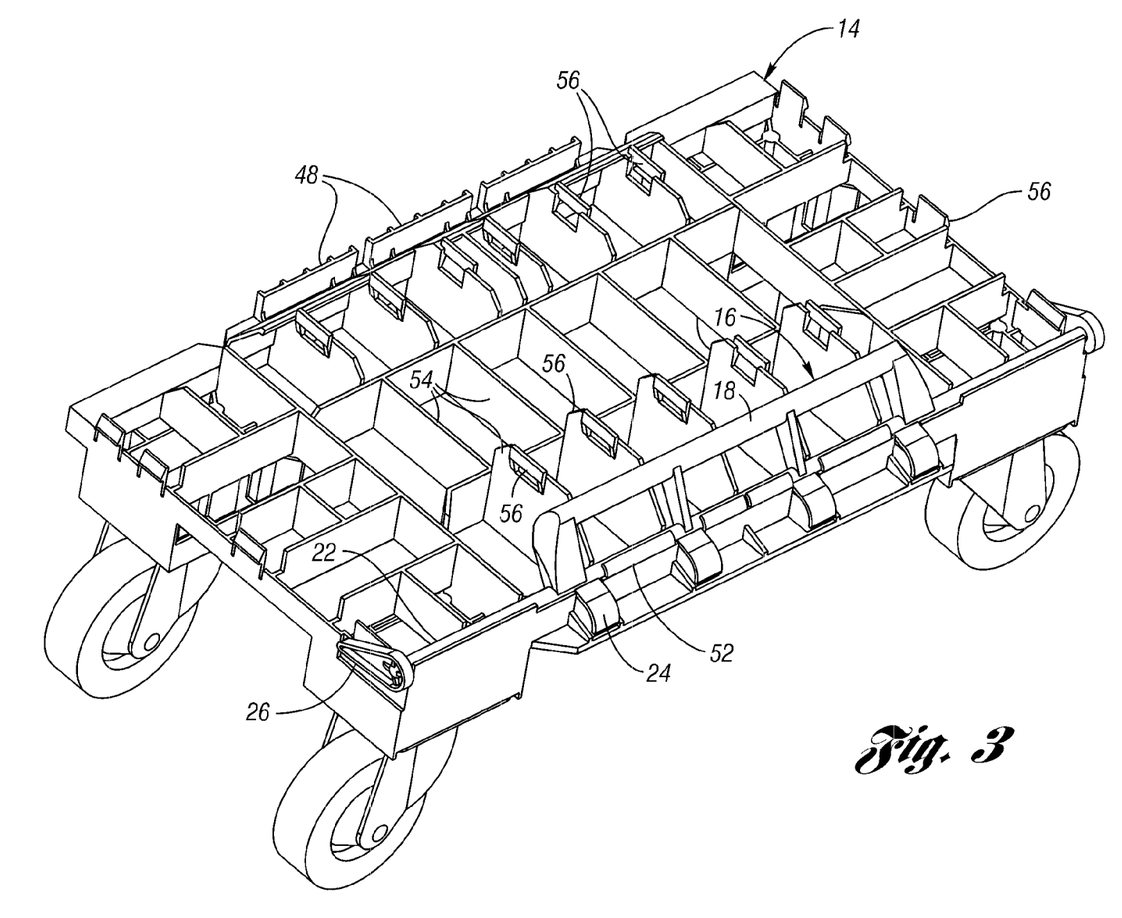
FIG. 3 is a perspective view of the dolly of FIG. 1 with the upper deck portion removed.

FIG. 3 is a perspective view of the dolly 10 with the upper deck portion 12 removed. As shown, the pivot bar 22 of the connector 16 is rotatably supported and retained by pivot bar receivers 52, into which the pivot bar 22 is snapfit. The lower deck portion 14 includes a grid of ribs 54, some of which include snapfit connectors 56 at upper ends thereof.

Figure 4:
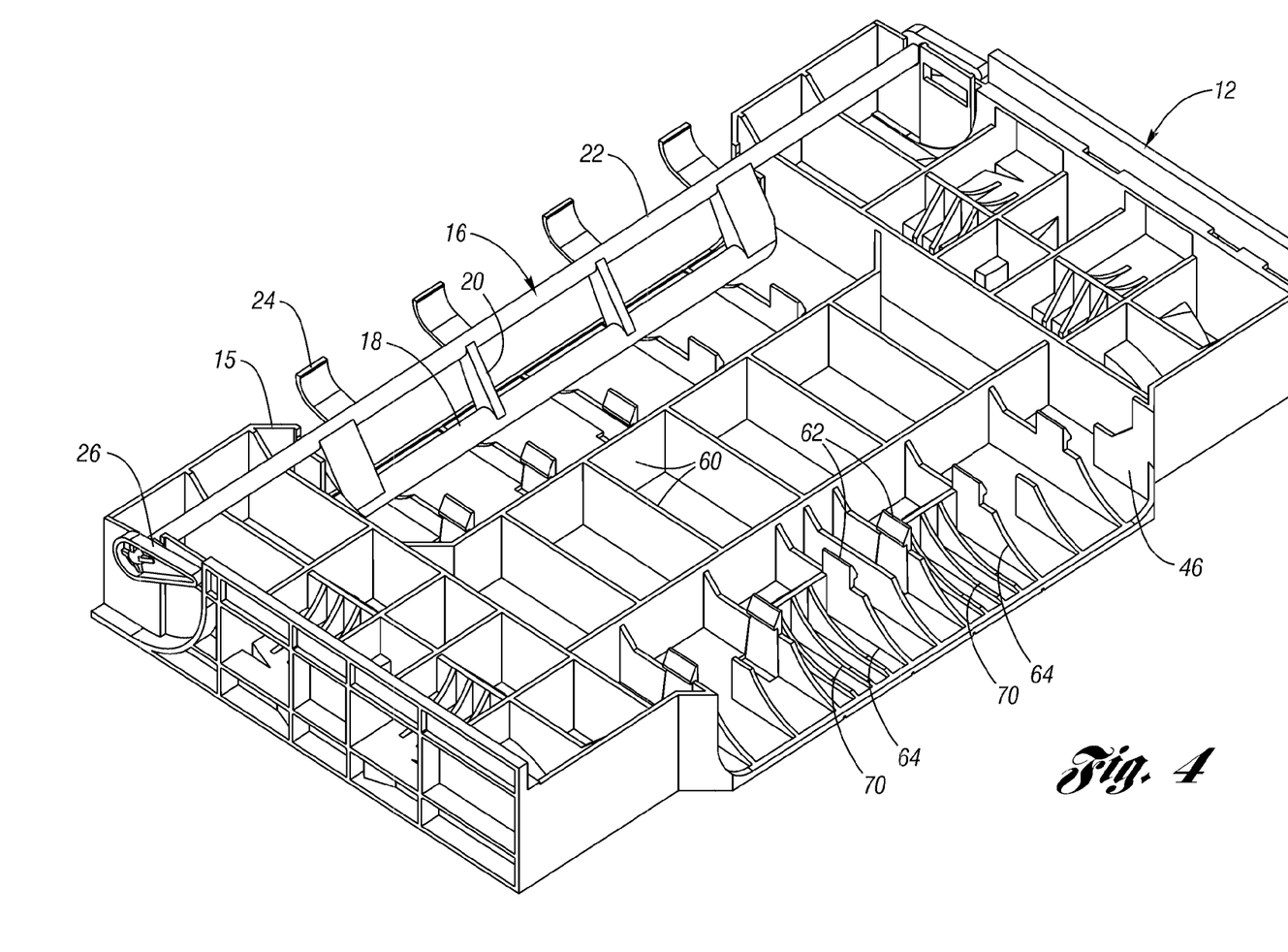
FIG. 4 is a bottom perspective view of the upper deck portion and connector of the dolly of FIG. 1.

FIG. 4 is a bottom perspective view of the upper deck portion 12 and connector 16. The upper deck portion 12 includes a plurality of ribs 60, some of which have snapfit connectors 62 formed at lower ends thereof. The pockets 64 are partially defined by curved ribs 70 in the upper deck portion 12.

Figure 5:
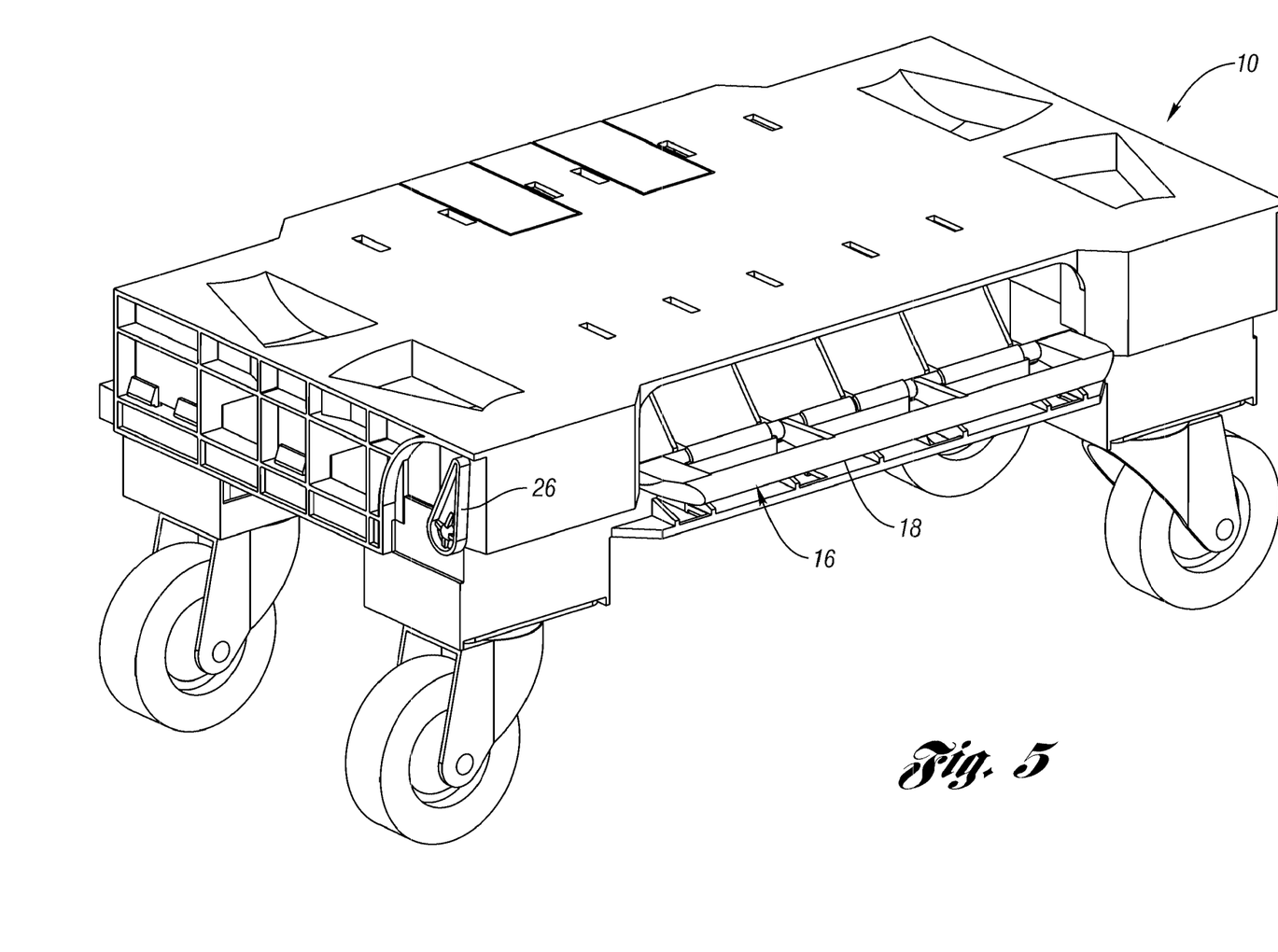
FIG. 5 is a perspective view of the dolly of FIG. 1 with the connector in the deployed position.
Figure 6:
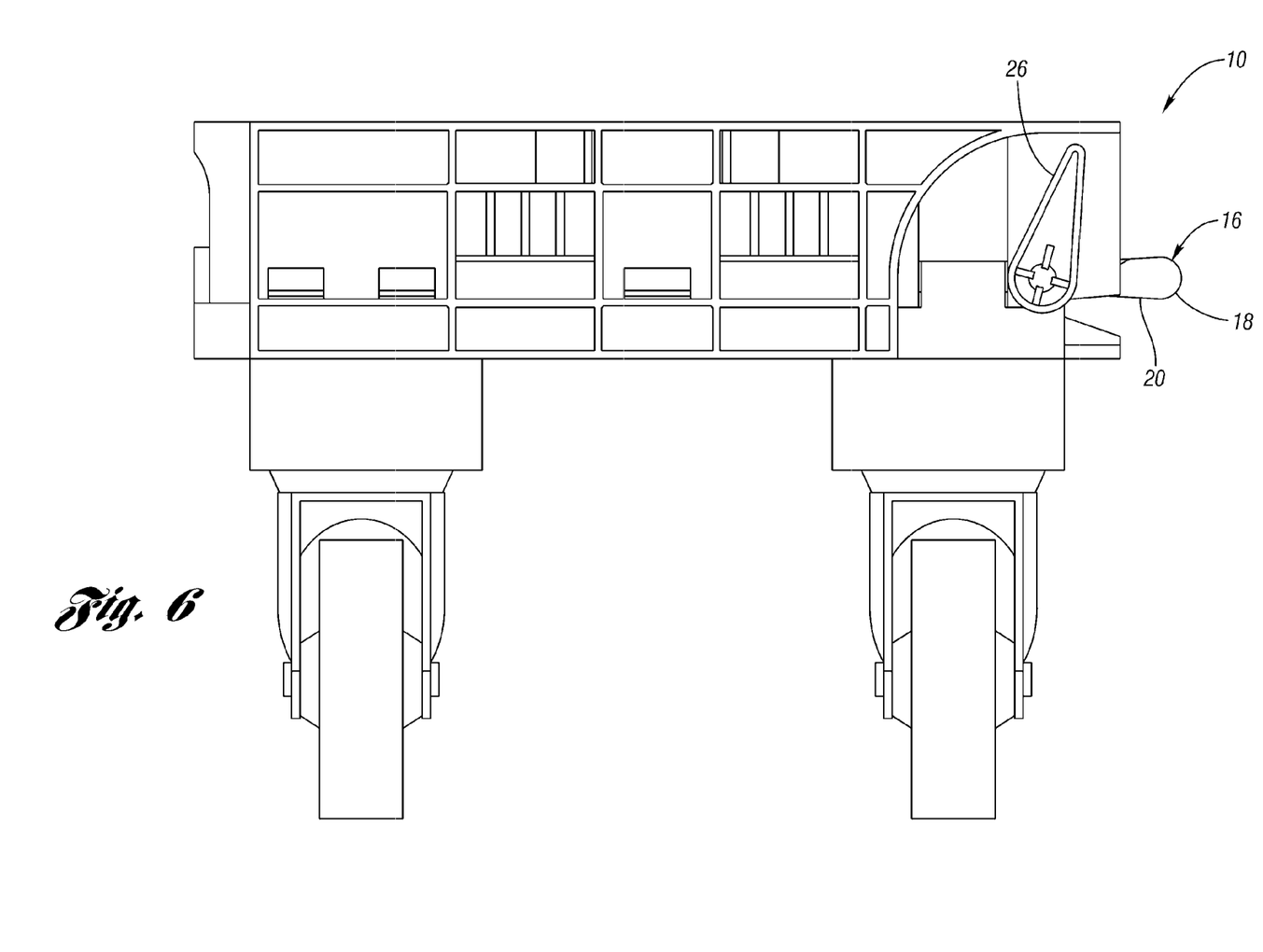
FIG. 6 is an end view of the dolly of FIG. 5.

FIG. 5 shows the assembled dolly 10 with the connector 16 in the deployed position. When the handle 26 is rotated to the position shown, the connector 16 is rotated to where the connector bar 18 protrudes from the side of the dolly 10, as shown in FIG. 6.

Figure 7:
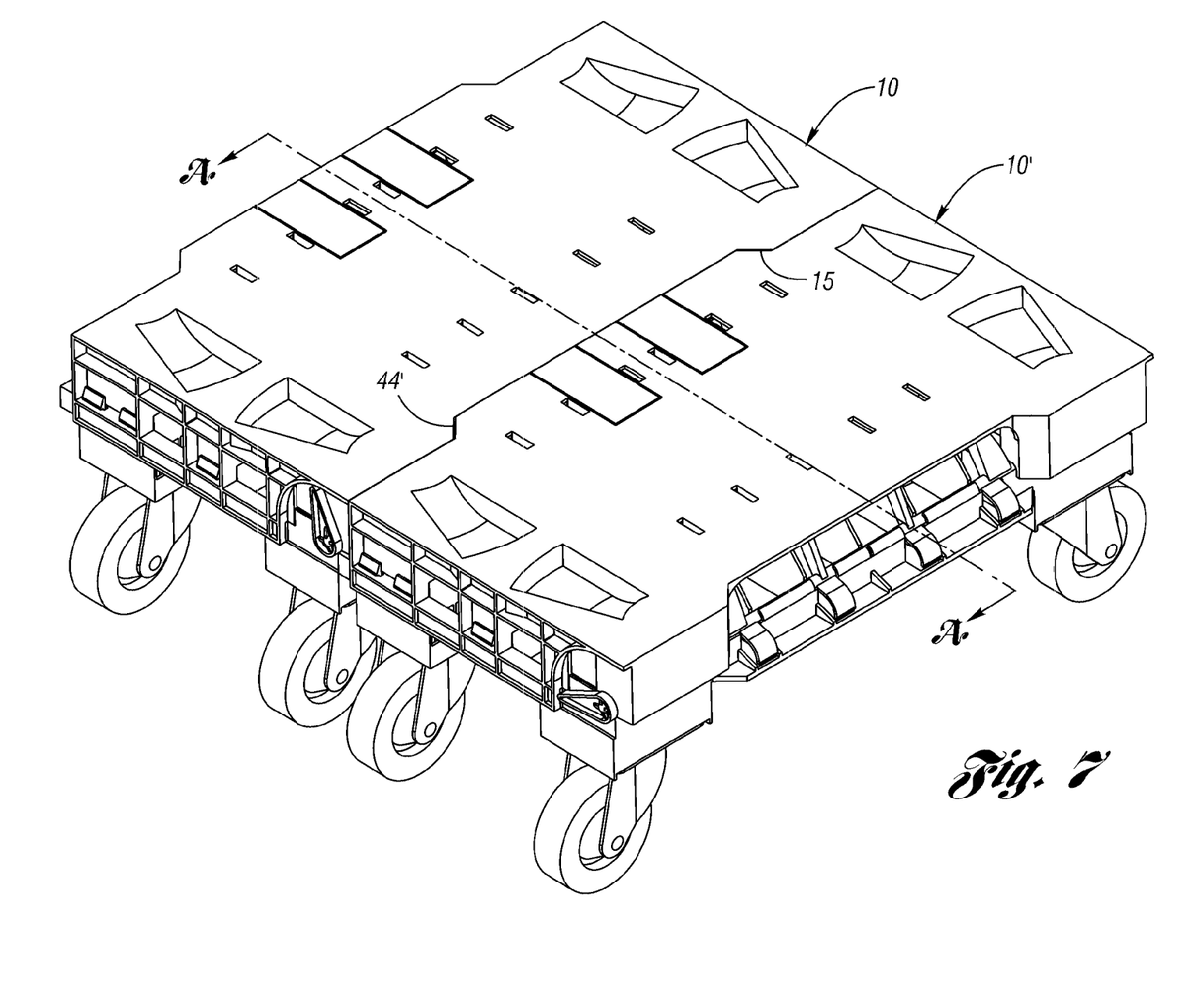
FIG. 7 is a perspective view of the dolly of FIG. 1 during a first connection step to a similar dolly.
Figure 8:
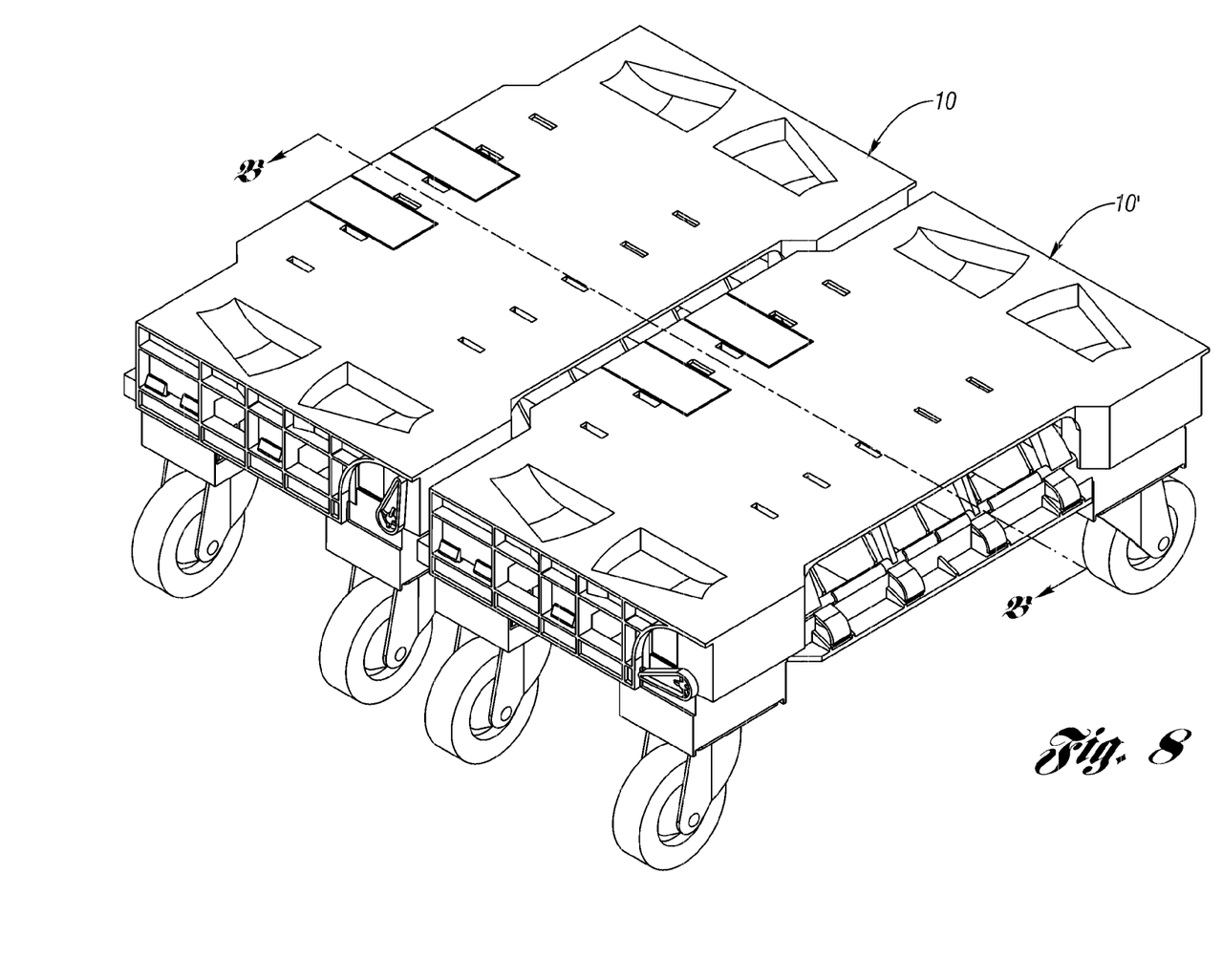
FIG. 8 illustrates the dollies of FIG. 7 connected to one another.

FIG. 7 illustrates the dolly 10 abutting a similar dolly 10'. The protruding portion 44' of the dolly 10' fits into the recessed area 15 of the dolly 10. FIG. 8 illustrates that when the dolly 10 and the dolly 10' are connected to one another, their decks are spaced slightly apart from one another. The method of connection is described in more detail in FIGS. 9-11. Note that the although the casters 38 are always illustrated with the wheels oriented in the same position, it is understood that they would pivot about their axes (e.g. ninety degrees) to permit one or both of the dollies 10, 10' to be rolled toward one another.

Figure 9:
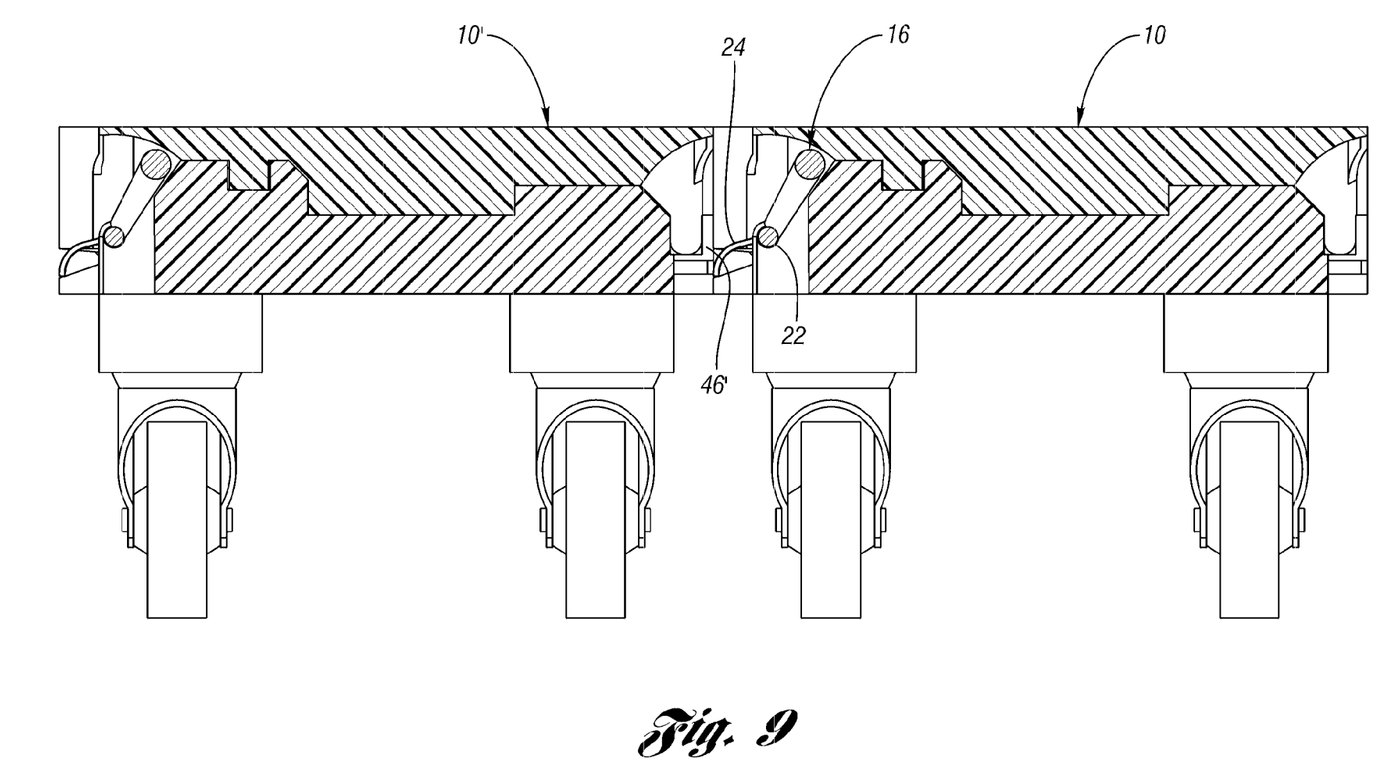
FIG. 9 is a section view through the dollies of FIG. 7 taken along line A-A of FIG. 7 during an initial connection step.
Figure 10:
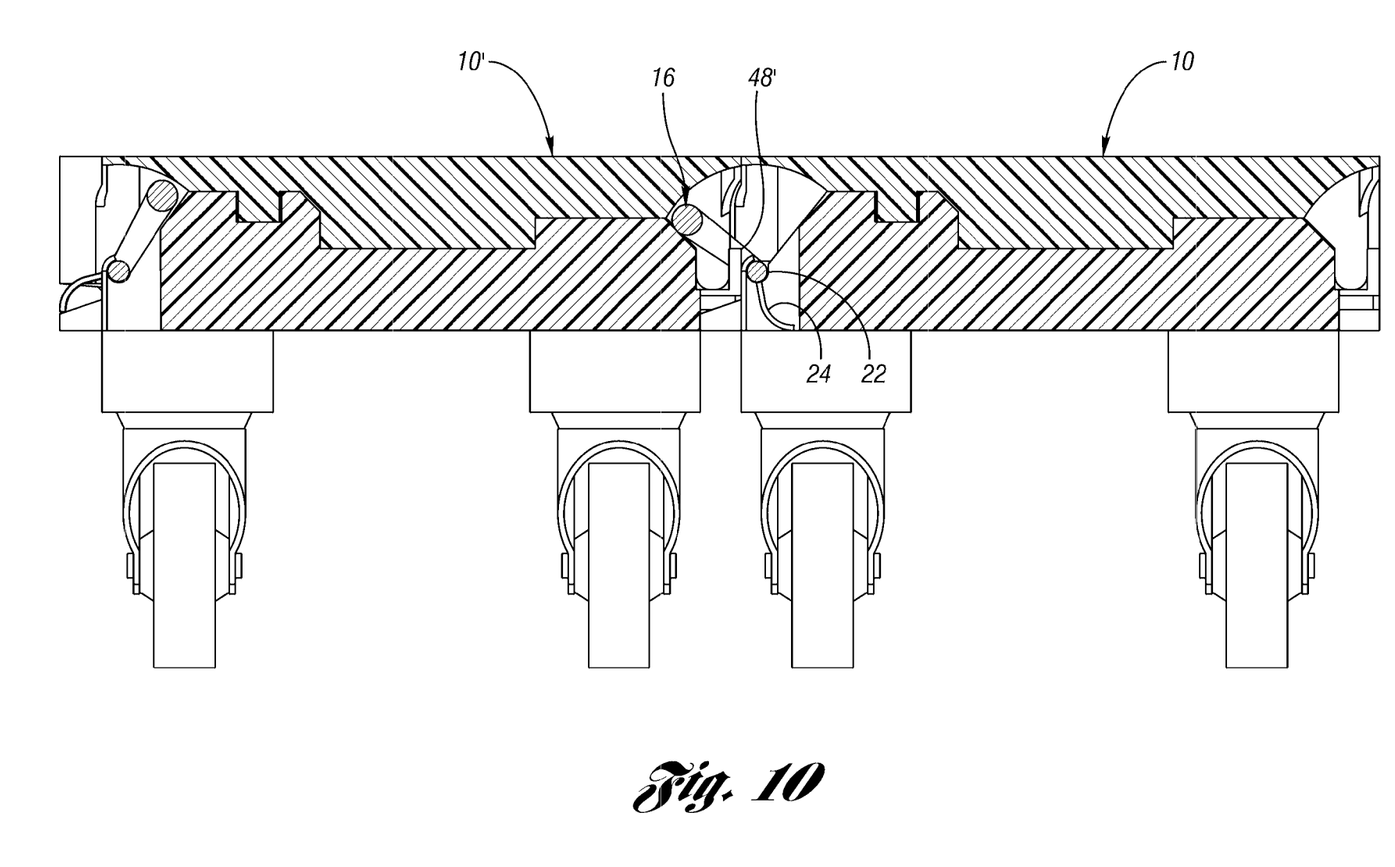
FIG. 10 illustrates the dollies of FIG. 9 during a second connection step.
Figure 11:
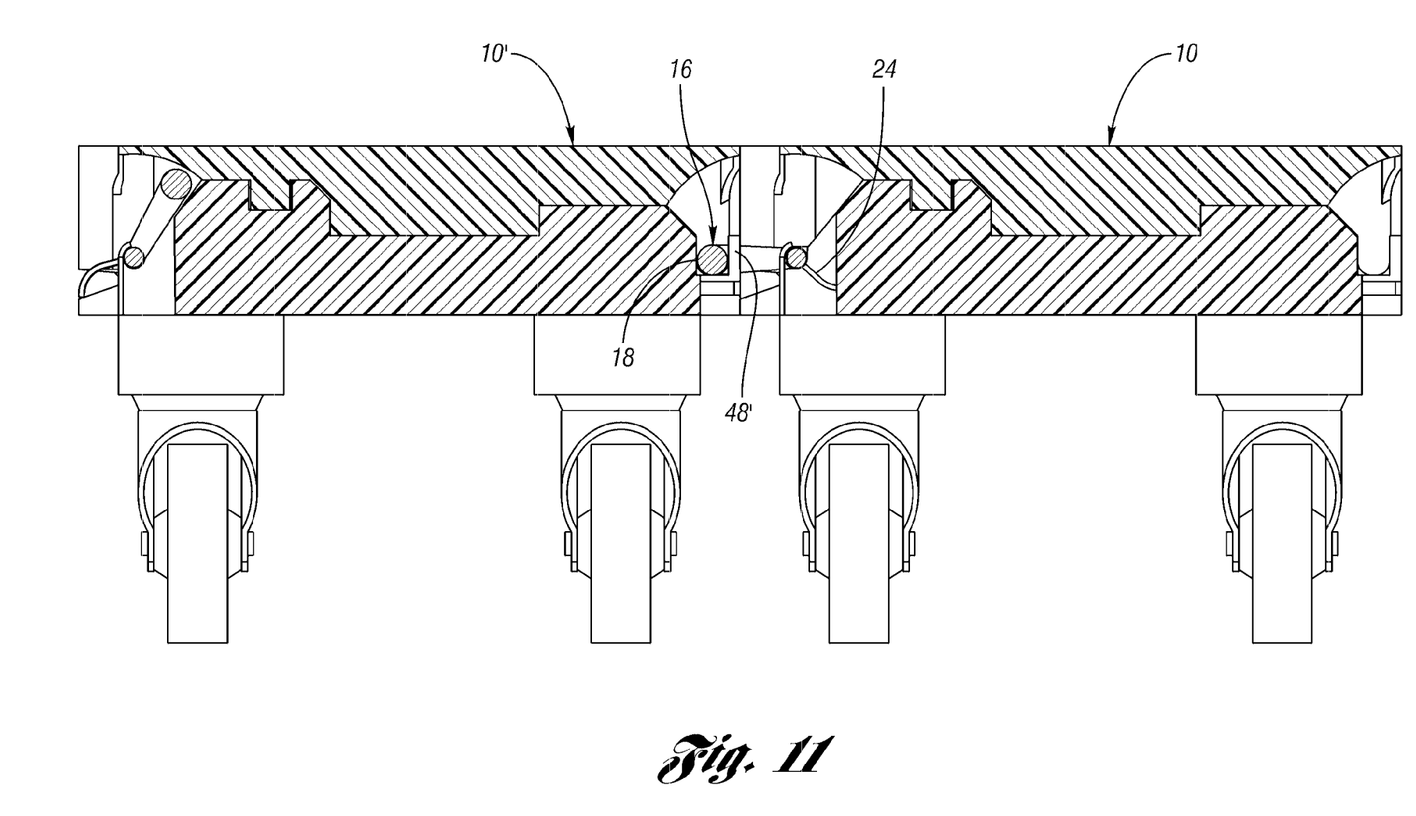
FIG. 11 illustrates the dollies of FIG. 9 connected to one another.
Figure 12:
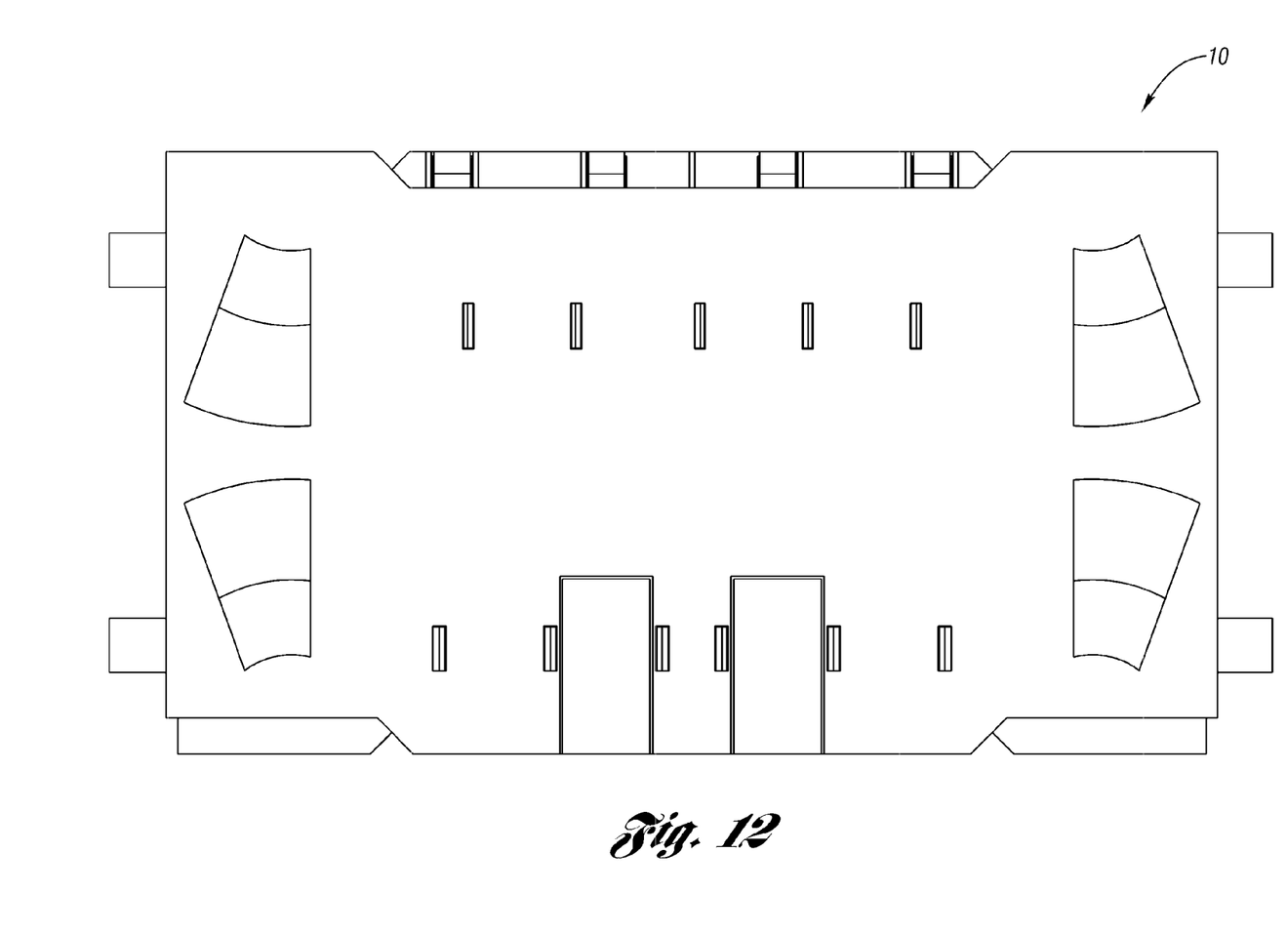
FIG. 12 is a top view of the dolly of FIG. 1.
Figure 13:
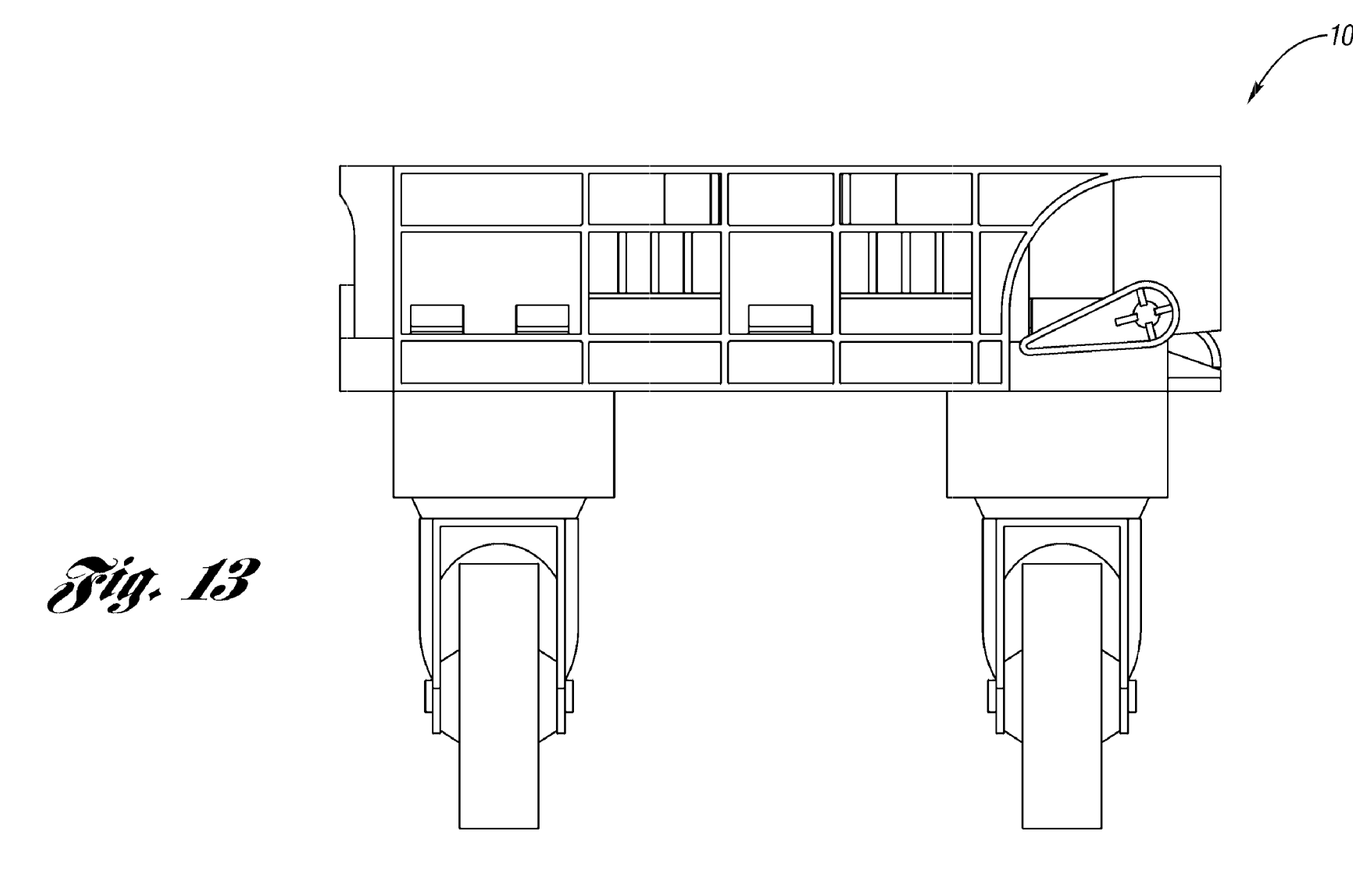
FIG. 13 is an end view of the dolly of FIG. 1.
Figure 14:
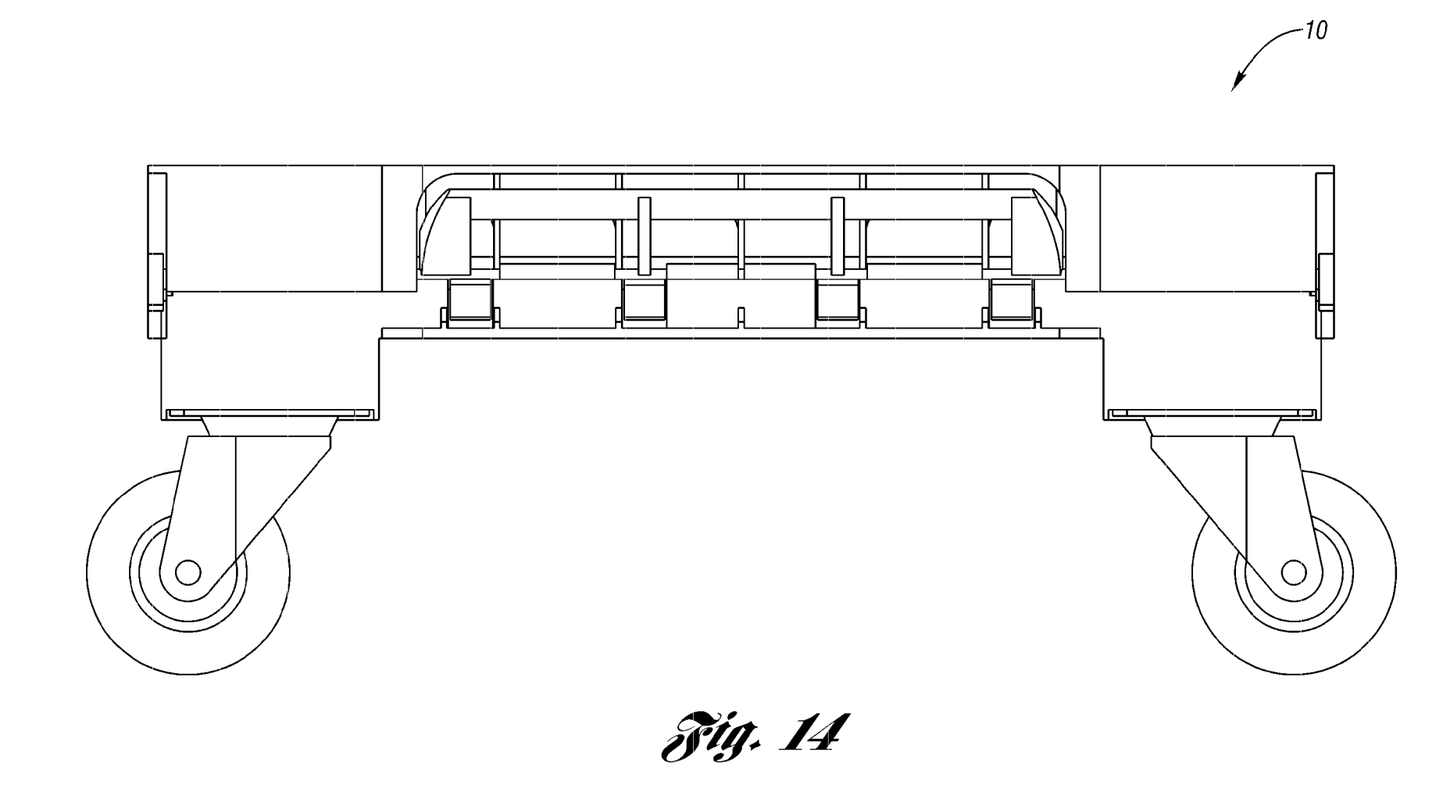
FIG. 14 is a connector side view of the dolly of FIG. 1.
Figure 15:
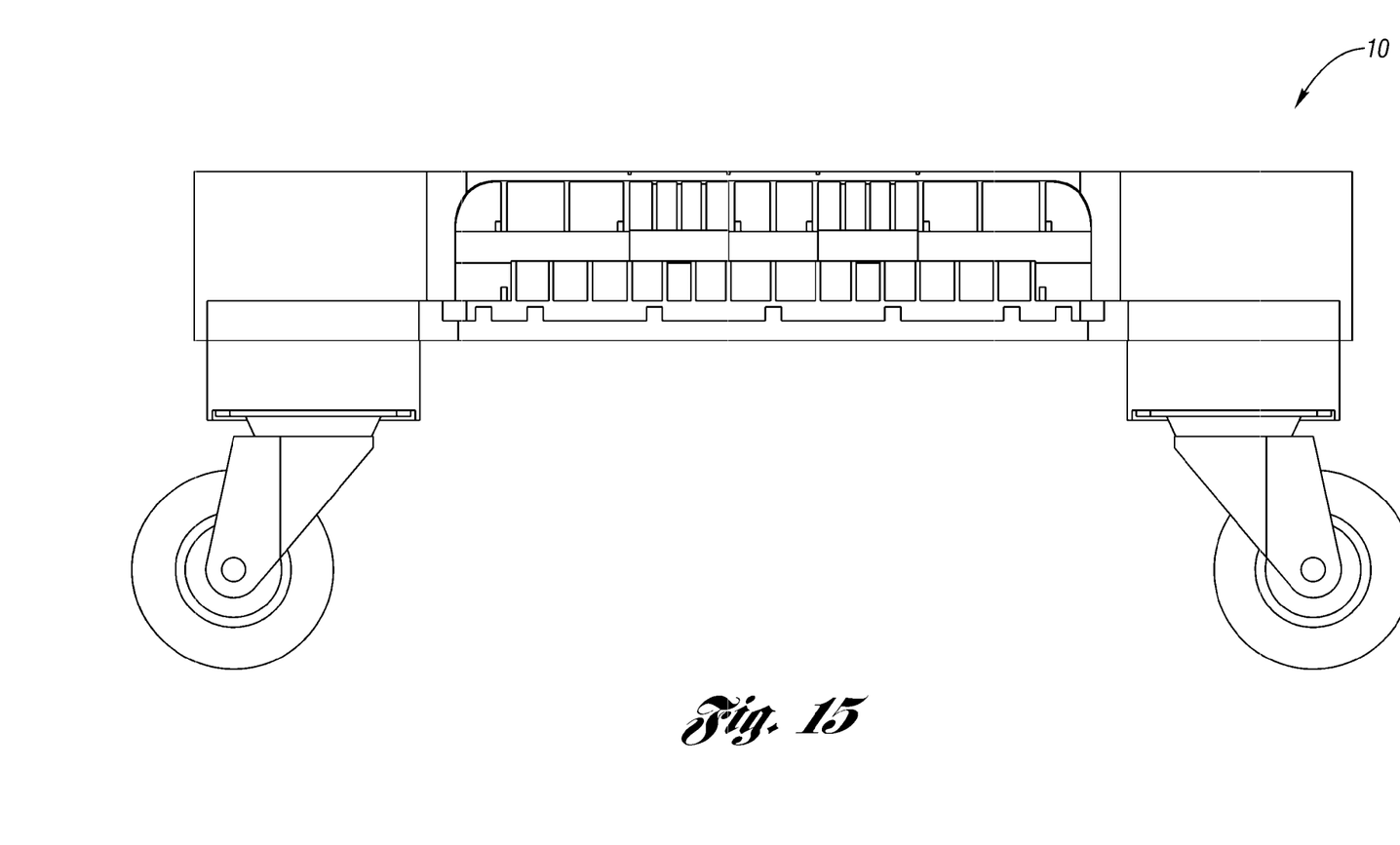
FIG. 15 is a receiver side view of the dolly of FIG. 1.

A section view taken through the dollies 10, 10' abutting one another, but not yet connected, is shown in FIG. 9. In this position, when the dollies 10, 10' are first brought into contact with one another, the lower ledge 46' of the dolly 10' contacts the levers 24 of the connector 16 of the dolly 10. As the dollies 10, 10' are urged toward one another, the connector 16 pivots about the pivot bar 22 to the position shown in FIG. 10. The dollies 10, 10' are then moved apart slightly so that the bar 10 of the connector 16 is connected behind the vertical protrusions 48' of the dolly 10' as shown in FIG. 11. The dollies 10, 10' are thus connected such that they can support goods on their decks together and be moved along a floor together as a single unit. In order to disconnect the two dollies 10, 10', the handle 26 can be rotated back to the position shown in FIG. 1. This causes the connector 16 to pivot and move the connector bar 18 out from behind the vertical protrusions 48' of the dolly 10'. FIG. 12 is a top view of the dolly 10. FIG. 13 is an end view of the dolly 10. FIG. 14 is a connector side view of the dolly 10. FIG. 15 is a receiver side view of the dolly 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. A dolly comprising:
   a deck;
   a plurality of casters extending downward below the deck;
   a connector pivotably connected to the deck, the connector pivotable about an axis generally parallel to an upper support surface of the deck between a retracted position and a connecting position; and
   a receiver fixed relative to the deck for receiving the connector of a similar dolly adjacent thereto to connect the dolly to the similar dolly, wherein the receiver extends in a direction generally parallel to the deck.

2. The dolly of claim 1 wherein the connector is pivotable from the retracted position to the connecting position by contact between the dolly and the similar dolly.

3. The dolly of claim 1 wherein the deck includes a connector side and an opposite receiver side, the connector proximate the connector side, the receiver proximate the receiver side.

4. The dolly of claim 1 further including a handle for permitting manual rotation of the connector between the retracted position and the connecting position.

5. The dolly of claim 1 wherein the connector includes a connector bar spaced from a pivot axis about which the connector pivots between the retracted position and the connecting position.

6. The dolly of claim 1 wherein the deck further includes an upper deck portion and a lower deck portion, the connector located between the upper and lower deck portions.

7. The dolly of claim 1 wherein the connector contacts the deck in the retracted position.

8. The dolly of claim 1 further including a protruding portion on a first side and a recess on a second side wherein the protruding portion is configured to mate with a recess on a similar dolly.

9. The dolly of claim 1 wherein the receiver extends in a direction generally parallel to the connector.

10. The dolly of claim 4 wherein the handle is attached to a pivot bar.

11. The dolly of claim 5 wherein the pivot axis is generally parallel to an upper support surface of the dolly.

12. The dolly of claim 11 wherein the connector further includes a pivot bar pivotably connected to the deck, the pivot axis extending through the pivot bar.

13. The dolly of claim 12 further including at least one lever extending from the pivot bar, the at least one lever causing pivoting of the connector toward the connecting position upon contact with the similar dolly.

14. A method of connecting two dollies including the steps of:
   a) bringing a connector side of a first dolly and a receiver side of a second dolly toward one another, including bringing the connector side into contact with the receiver side to cause the rotation of the connector;
   b) causing rotation of a connector on the first dolly about a pivot axis generally parallel to the connector side, from a retracted position toward a connecting position in which the first dolly and the second dolly are connected; and
   c) rotating a handle after said steps a) and b) to move the connector back toward the retracted position, thereby disconnecting the first dolly and the second dolly.

15. The method of claim 14 wherein the connector includes a connector bar spaced from a pivot axis of the connector and wherein the connector bar is moved into the receiver side of the second dolly by the rotation of said step b).

16. The method of claim 14 wherein said step a) causes said step b).

17. The method of claim 14 wherein the connector is in a first rotational position in the retracted position and the connector is in a different rotational position in the connecting position.

18. The method of claim 15 wherein the connector includes at least one lever that contacts the second dolly during said step a) to perform said step b).

* * * * *

UNITED STATES PATENT AND TRADEMARK OFFICE
CERTIFICATE OF CORRECTION

| | | |
|---|---|---|
| PATENT NO. | : 8,317,204 B2 | Page 1 of 1 |
| APPLICATION NO. | : 12/238765 | |
| DATED | : November 27, 2012 | |
| INVENTOR(S) | : Meers et al. | |

It is certified that error appears in the above-identified patent and that said Letters Patent is hereby corrected as shown below:

IN THE CLAIMS:

In Claim 14, column 4, line 34; delete first occurrence "the"

In Claim 14, column 4, line 34; replace second occurrence of "the" with --a--

In Claim 14, column 4, line 35; prior to "causing" add --wherein--

In Claim 14, column 4, line 35; replace "a" with --the--

In Claim 14, column 4, line 35; after "dolly" insert --is--

Signed and Sealed this
Twenty-fifth Day of November, 2014

Michelle K. Lee
*Deputy Director of the United States Patent and Trademark Office*